H. M. TALLMAN.
HAY BALING PRESS.
APPLICATION FILED DEC. 4, 1905.

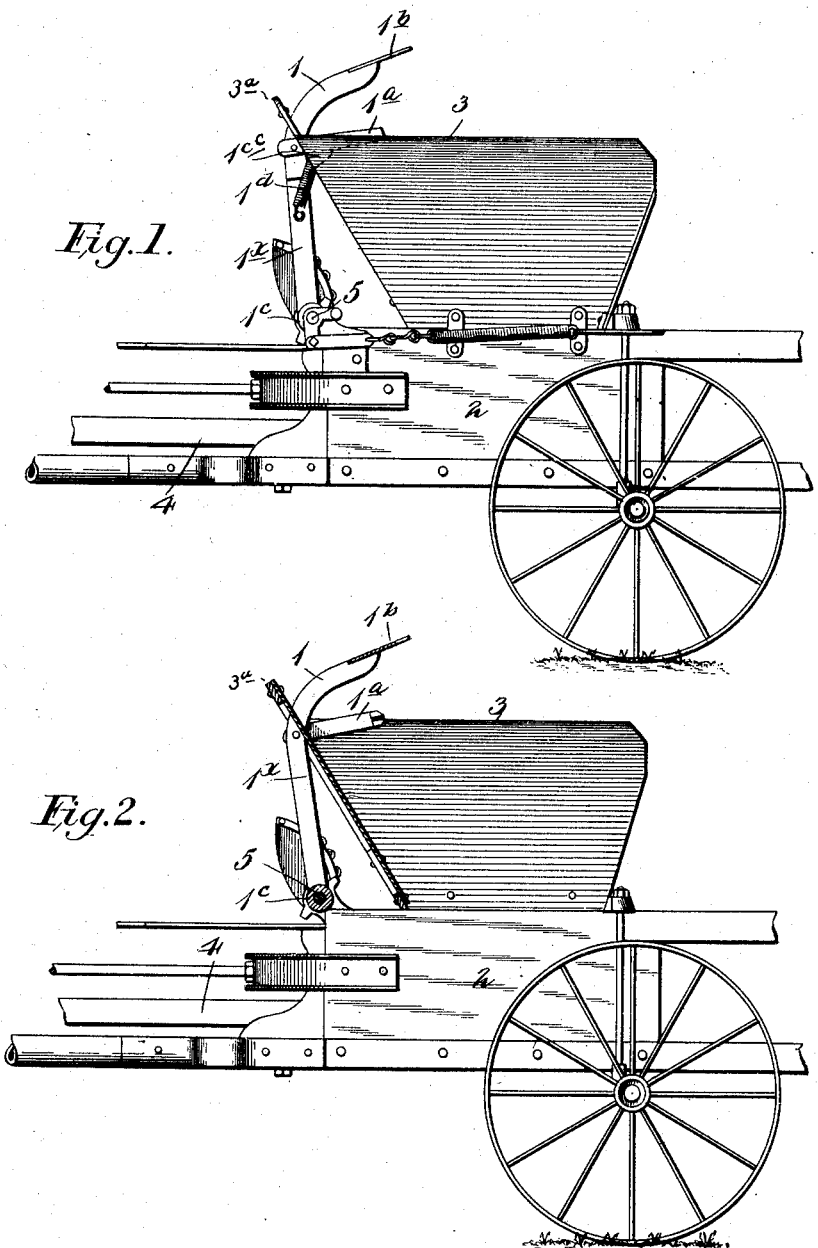

901,849.

Patented Oct. 20, 1908.

2 SHEETS—SHEET 2.

Witnesses:
W. H. Durand
J. W. Pfister

Inventor:
H. M. Tallman,
By Sans Dagger &Co.
Attorneys

UNITED STATES PATENT OFFICE.

HORACE M. TALLMAN, OF SHELBYVILLE, ILLINOIS, ASSIGNOR TO ADMIRAL HAY PRESS CO., OF KANSAS CITY, MISSOURI, A CORPORATION OF MISSOURI.

HAY-BALING PRESS.

No. 901,849.          Specification of Letters Patent.          Patented Oct. 20, 1908.

Application filed December 4, 1905. Serial No. 290,232.

*To all whom it may concern:*

Be it known that I, HORACE M. TALLMAN, a citizen of the United States, residing at Shelbyville, in the county of Shelby and State of Illinois, have invented certain new and useful Improvements in Hay-Baling Presses, of which the following is a specification.

My invention relates to improvements in hay-baling presses, particularly that class known as the re-bounding-plunger type.

It has for its object, principally, to provide for feeding the hay effectively and with facility into the baling chamber, close to the throat or folder thereof, also in front of the plunger, for forcing the hay or material well down thereinto at those points; and, incidentally, to effect the ready displacement or elevation of the nearer feeder out of the way by the action of the plunger; and to carry out these objects in a simple and effective manner.

Said invention consists of certain features substantially as hereinafter fully disclosed and pointed out by the claims.

Figure 3:
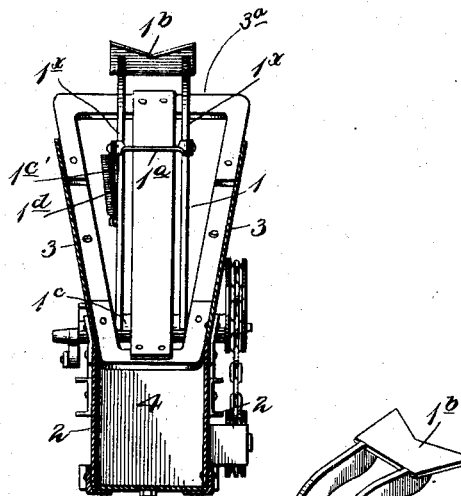
Figure 4:
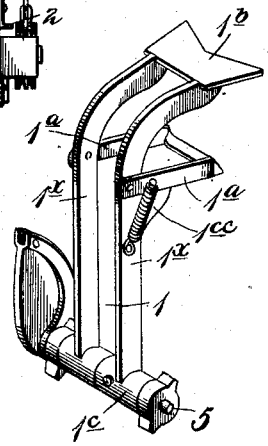
Figure 5:
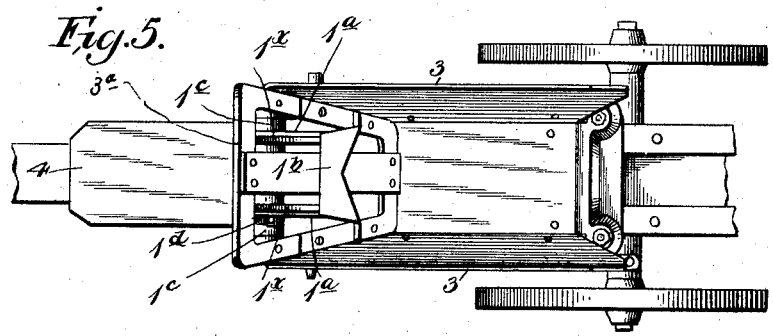

In the accompanying drawing illustrating the preferred embodiment of my invention—Figure 1 is a side elevation of a sufficient portion of a hay-baling press, to show the application of said invention, parts of the press being broken away. Fig. 2 is a vertical longitudinal section, and Fig. 3 is a transverse section of the same, in the latter the view-point being toward the forward end of the machine. Fig. 4 is a disassembled perspective view of the principal features or feeders of the invention. Fig. 5 is a plan view of Fig. 1.

In the disclosure of my present invention, comprising mainly feeders 1, $1^a$, I have shown the same as applied to, and operative in connection with the press-chamber 2, hopper 3, plunger 4, and the means of connection therebetween as later described, all of my patent dated April 11, 1905, and No. 787,132.

The main feeder 1 is constituted of parallel arms $1^x$ having fixed between their outer curved end-portions a transverse plate or blade $1^b$ preferably having a double inclined lower or effective edge, with the inclinations meeting centrally of said edge. Said arms $1^x$ have their inner ends provided or terminated in tubular formations $1^c$ suitably held upon, and receiving a rock shaft 5, answering to the correspondingly actuated shaft (9) of the feeder-arms noted in said patent and which shaft is accordingly operated, as therein described, to suitably depress the upper-end carried blade or plate $1^b$ of said arms for feeding the hay or contents of the hopper 3 into the press or plunger-chamber 2 below. As in said patent, the hopper 3 is adapted to permit said feeder-arms to extend therethrough and have the requisite movement therein, the upper forward edges of said arms being adapted to be held against the inner or lower edges of the yoke-like member $3^a$ of said hopper as against the withdrawal of the upper-end carried plate or blade $1^b$ from the hopper under the action of the feeder automatically returning spring which latter is also disclosed in said patent. Said arms are adapted to permit their upper end carried plate or blade $1^b$ to finally assume a position in the press or plunger-chamber, as they are actuated in feeding the hay or contents of the hopper 3 into said chamber, suitably in advance of the plunger for forcing said contents or hay well down in front of said plunger, the purpose of which is apparent.

The supplemental feeder $1^a$ is preferably of bail-like formation, having the inner ends of its arms pivoted laterally to the arms $1^x$ of the primary feeder, near the plate or blade equipped end-portions thereof, and held normally in a position practically at right-angles to said arms, the pivoted end of one arm of said supplemental feeder being superposed with relation to a stop $1^{cc}$ secured to the corresponding arm of the feeder 1. Said supplemental feeder is subjected to the action of a preferably helical spring $1^d$ suitably connected thereto and to an arm of the primary feeder and by means of said spring, said stop $1^{cc}$ is aided to retain said feeder in its normal position, said spring also permitting said supplemental feeder or bail a yielding action when necessary as later noted. This supplemental feeder is so arranged that, as the primary feeder descends into the hopper in performing its office as aforesaid, it, the supplemental feeder, will act upon the hopper-contents or hay close to the folder or throat of the press-chamber, and force said contents well down into said chamber at that point, thus aiding the primary feeder to effectively feed or force said hopper contents or hay into the press-chamber, for the action of the plunger, as well understood.

It will be noted that, in event of the supplemental feeder becoming "stuck" or wedged in the material or hay from heavy "choke"-feeding, as not infrequently happens in the feeding operation, said feeder would yield under the advancing action of the plunger, as is apparent, and thus permit its displacement or removal out of the way of the plunger; the feeder subsequently returning to its normal position under the action of its spring; suitable provision being made for the release of the primary feeder in event of its becoming stuck the same as described in said patent. As in some other types of baling presses, the operation of feeding is reversely of that above described, it is obvious that the aforesaid arrangement of parts would have to be accordingly readjusted which it is not thought requires any further explanation or illustration herein.

I claim:

1. In a baling press, the combination with a press-chamber, of a rock-shaft mounted thereon, feeder arms mounted on the shaft, a plate on the arms, and a supplemental feeder pivoted to the arms and adapted to be forced out of the way of the plunger.

2. In a baling press, the combination with a press-chamber, of a rock-shaft journaled thereon, feeder arms mounted on the shaft, a blade connected to the arms, a supplemental feeder pivoted to the arms, and means for limiting the movement of the supplemental feeder.

In testimony whereof I affix my signature in presence of two witnesses.

HORACE M. TALLMAN.

Witnesses:
  Braz D. Tull,
  L. A. Gaston.